United States Patent [19]
Mohs

[11] Patent Number: 5,293,910
[45] Date of Patent: Mar. 15, 1994

[54] PNEUMATIC SAFETY CIRCUIT FOR AIR INFLATION DEVICES

[75] Inventor: Michael C. Mohs, London, Canada

[73] Assignee: Bruno Wessel Limited, Canada

[21] Appl. No.: 773,918

[22] PCT Filed: Dec. 18, 1989

[86] PCT No.: PCT/US89/05837

§ 371 Date: Oct. 25, 1991

§ 102(e) Date: Oct. 25, 1991

[30] Foreign Application Priority Data

May 1, 1989 [CA] Canada .................. 598396

[51] Int. Cl.$^5$ .............................. B60C 23/00
[52] U.S. Cl. ......................... 141/38; 141/95;
141/197; 73/146.2; 152/415; 157/1.1;
137/492.5; 137/224
[58] Field of Search .................. 137/223–225,
137/492.5, 488, 492; 73/146.2, 146.3; 251/28;
141/4, 38, 83, 94, 95, 46, 47, 50, 197;
152/415–417, 427, 429, 137, 251, 1418, 152;
157/1.0, 1.1

[56] References Cited

U.S. PATENT DOCUMENTS

| | | | |
|---|---|---|---|
| 2,761,601 | 9/1956 | Van Vooren | 141/38 X |
| 2,938,537 | 5/1960 | Silver et al. | 137/492.5 X |
| 3,279,484 | 10/1966 | Brinkel | 251/28 X |
| 3,283,775 | 11/1966 | Spender | 137/224.5 |
| 4,274,440 | 6/1981 | Richard, Jr. | 137/492 X |
| 4,421,151 | 12/1983 | Stumpe | 152/417 |
| 4,702,287 | 10/1987 | Higbie et al. | 141/4 |
| 4,744,399 | 5/1988 | Magnuson et al. | 152/417 |
| 4,782,879 | 11/1988 | Le Chatelier et al. | 152/417 |
| 4,862,912 | 9/1989 | Stohh et al. | 137/492.5 X |
| 4,872,492 | 10/1989 | McAnally | 141/38 |
| 4,905,742 | 3/1990 | Mohs | 141/38 |
| 5,168,911 | 12/1992 | Gottschalk | 157/1.1 |

*Primary Examiner*—J. Casimer Jacyna
*Attorney, Agent, or Firm*—Anthony J. Casella; Gerald E. Hespos

[57] ABSTRACT

The invention provides an improved pneumatically operated circuit for automatically shutting off the flow of high pressure air being introduced into an object to be inflated, such as a tire, when the pressure in the object reaches a preselected maximum pressure significantly below that of the high pressure supply. The air at high pressure is introduced into the object and into a control duct also connected to the object, until pressure in the control duct overcomes the bias of a control valve, at which time the control valve closes to interrupt the flow of high pressure air and allow pressure in the object and the control duct to equilibrate; if the equilibrated pressure does not continue to overcome the bias of a control valve, the control valve again opens to admit additional high pressure air to the object and control duct until the bias of the control valve again is overcome and the control valve closed as previously, repeating the closing cycle.

15 Claims, 3 Drawing Sheets

PNEUMATIC SAFETY CIRCUIT FOR AIR INFLATION DEVICES

BACKGROUND OF THE INVENTION

1. Field of the Invention

This invention relates to pneumatic safety circuits for air inflation devices. More particularly, it relates to pneumatic safety circuits that can be installed in the pneumatic circuits of tire inflating machines or tire mounting machines being built by a machine manufacturer and also can be installed on existing tire inflating machines or tire mounting machines which are generally devoid of pneumatically operated safety circuits, to retrofit them and upgrade their safety standards.

2. Description of the Prior Art

In garages and tire installation and repair shops, a supply of high pressure, "shop" air is available to operate the pneumatic portion of tire mounting machines that are used to press, lever, and wedge tires off or onto tire rims or automobile wheels. The same air supply, at the shop pressure usually in the range of 125 and 175 psi, (862 to 1207 KPa), is used to inflate the tires to the appropriate tire pressure usually in the range of 30–50 psi, (207 to 345 KPa), to insure they are in place on the wheels. In order to seat the beads of a modern tire to the rim, it is sometimes necessary to overinflate the tire temporarily, after which the tire pressure is reduced to the desired running pressure. Also, the tires often are inflated before a valve core is installed in the valve stem, to expedite build-up of pressure in the tire. With no valve core in the valve stem, tire pressure can build up extremely rapidly with shop air.

Control of pressure build-up in the tire generally is achieved by operation of a pneumatic supply valve, either manual or pedal operated, which opens and closes in the line from the shop air supply to the tire being inflated. A pressure gauge in this line indicates, when the supply valve is closed and the line connected to the tire, what the pressure in the tire is. By intermittently operating the supply valve, the build-up of pressure in the tire can be monitored, but careless or inattentive operation of the supply valve has been known to overinflate and burst tires, causing serious damage to personnel and property.

To preclude such accidents, it has been suggested to have additional switching facilities to control the shop air supply, but these facilities appear primarily to involve electrical circuitry, making them inappropriate or useless for retrofitting existing tire mounting machines which are entirely pneumatic in operation. Furthermore, the additional switching facilities generally operated by merely reducing the pressure being applied to inflate a tire, thus greatly retarding the rate of inflation and inducing operators to bypass them to expedite their work.

In a Canadian patent application Serial No. 590114 filed 3 Feb. 1989 by Michael C. Molls and corresponding U.S. application Ser. No. 316,283 filed 27 Feb. 1989, there is disclosed a pneumatically operated safety circuit which automatically shuts off the flow of high pressure air being introduced into a tire when the pressure in the tire reaches a preselected maximum pressure significantly below the high pressure air supply. The high pressure air is supplied to the tire through a three-way pilot operated pneumatic valve whose position is alternated between an inflating cycle and a gauging cycle by operation of a pair of time-delay three-way pilot operated pneumatic valves which are set to allow high pressure air to inflate the tire for a first timed period, then interrupt high pressure air to the tire and for a second timed period, generally much briefer than the first timed period, gauge the pressure in the tire and, if the tire pressure has achieved the desired maximum pressure, interrupt the inflating cycle by maintaining the three-way pilot operated pneumatic valve in the gauging position. The safety circuit required the use of two time-delay three-way valves and involves greater expense for construction than can be achieved with the pneumatic circuit of the present invention.

SUMMARY OF THE INVENTION

The present invention consists of a pneumatic circuit for air inflation devices having a high pressure pneumatic supply line connected to an object to be inflated to a pressure significantly lower than the supply line pressure, through an operator controlled valve in said high pneumatic supply line, said pneumatic circuit comprising:

1) a first pneumatic duct connecting high pressure air from the outlet of said operator controlled valve to the inlet of a three-way pilot operated valve normally biased to a first position in which air pressure at the said inlet is transmitted through the valve then by a second pneumatic duct directly to the pilot side of 2) a spring biased, normally closed, pilot opened, two-way valve, said three-way pilot operated valve being adapted to overcome its bias by pneumatic pressure in its pilot which moves said there-way pilot operated valve to a second position in which air pressure in said second pneumatic duct is discharged back through said three-way valve to atmosphere;

3) a third pneumatic duct connecting high pressure air from the outlet of said operator controlled valve to the inlet of said spring biased two-way valve;

4) a fourth pneumatic duct connecting the outlet of said spring biased two-way valve to an object to be inflated, and;

5) a pneumatic control duct connecting said fourth pneumatic duct through a pneumatic flow control to a first pilot on said three-way pilot operated valve, the bias of said three-way pilot operated valve being adapted to maintain said three-way pilot operated valve in said first position when the pressure in said pneumatic control duct is below the pressure to which the object is to be inflated.

BRIEF DESCRIPTION OF THE DRAWINGS

The invention will be more readily understood from the following description thereof taken in conjunction with the accompanying drawings in which.

DETAILED DESCRIPTION OF THE PREFERRED EMBODIMENTS

As used herein, the term duct is intended to include any tube, pipe, enclosed channel, enclosed canal, or open-ended line capable of maintaining or conducting air under pressure without loss between its open ends. In the accompanying schematic drawings of the pneumatic circuits, the symbols used for the various pneumatic components are those adopted by the American National Standards Institute (ANSI) for such components; in the various Figures of the drawings, the same legends are used throughout it to identify identical parts.

Figure 1:
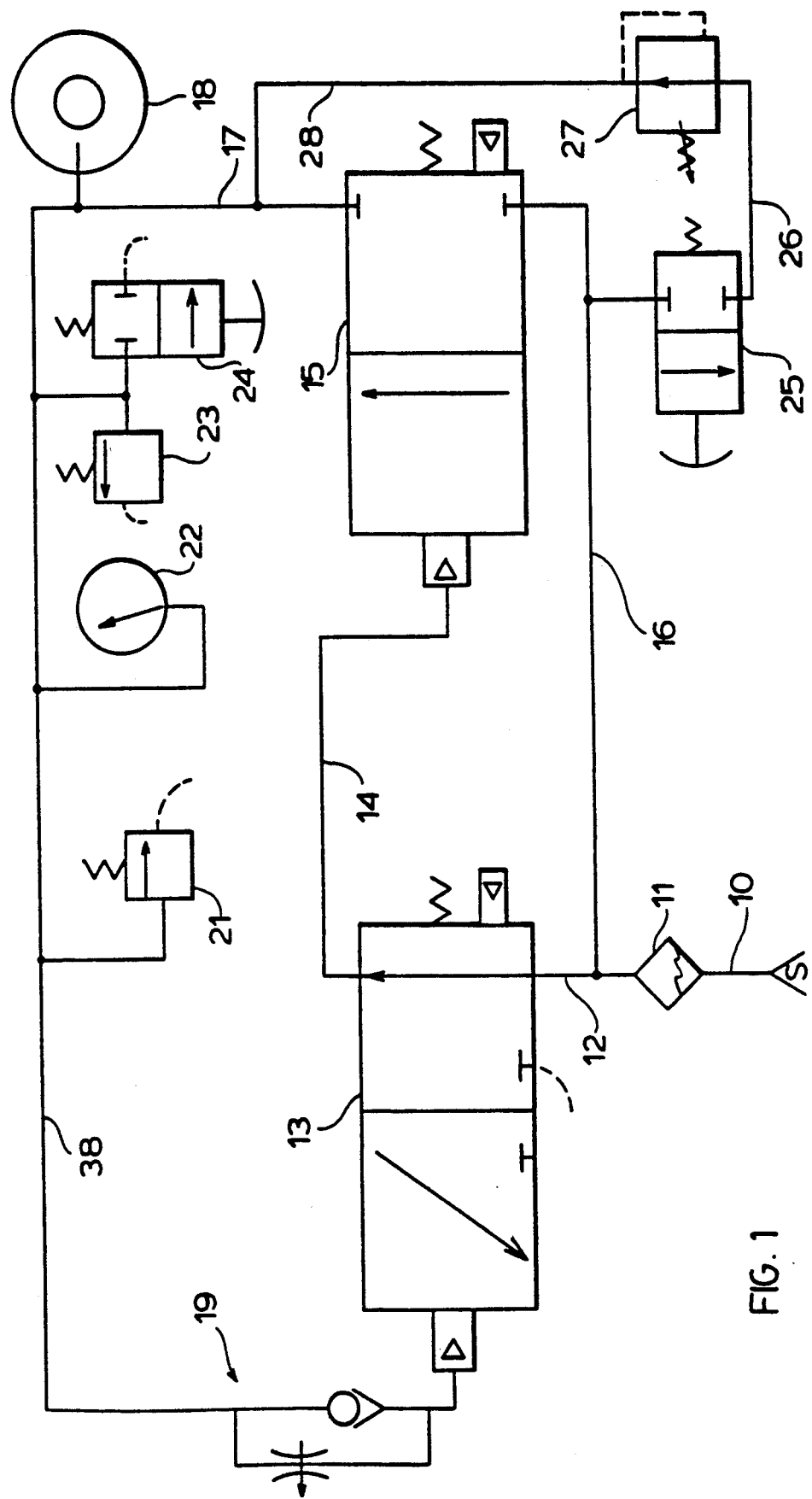
FIG. 1 is a schematic drawing, using available ANSI symbols, of a pneumatic circuit of the invention incorporated in a simple pneumatic tire inflating device, with some optional features included for increased convenience and assured safety.

In FIG. 1, legend 10 indicates a high pressure air supply line leading from an operator's pedal controlled or manually controlled valve, shown by a conventional sign f or a pneumatic supply. The supply conveniently comes from a commercial air compressor at a pressure in the range from 125 psi to 175 psi (862 KPa to 1207 KPa) and most conveniently is in the range of 140 to 150 psi (955 Kpa to 1034 KPa). The operator controlled valve conveniently is spring biased in the closed position and is maintained open only by the sustained action of an operator, although with pneumatic circuit of the present invention it need not be spring biased. However, it is preferred that it be so biased, as an extra safety feature against operator inattention.

Preferably air from the supply line 10 passes first through an optional air filter, 11, to remove entrained solids and liquids that could interfere with the operation of pneumatic components. Air from the supply then passes via a first duct to an inlet of a three-way, pilot operated, biased, normally open valve, 13, through which in this first position air passes, then via a second duct 14 to pressurize the pilot of a two-way pilot operated, spring biased, normally closed valve 15. As soon as the pilot of valve 15 is pressurized, valve 15 opens to pass air at high pressure from duct 12 through third duct 16, valve 15, and fourth duct 17, to the inlet of a tire or other object to be inflated, 18.

Because the volume of a tire or other object to be inflated is generally very large compared to the volume of the ducts or lines associated with inflating it, pressure in the tire builds up more slowly than in the associated lines or ducts, particularly if there is a valve core in the valve stem of the tire. Thus in control duct 38 extending from duct 17 beyond the connection to tire 18 from the supply line, pressure builds up in control duct 38 to ducts leading to fixed choke or other flow control 19 and optional features 21, 22, 23 and 24 to be described later.

The fixed choke or flow control 19 reduces the rate at which pressure builds up on the pilot of valves 13 and prolongs the period of application of pressure through line 17 to tire 18 before the pilot closes valve 13 by overcoming its bias. As soon as valve 13 does move to its second position, i.e., close, pressure in duct 14 discharges back through valve 13 to the atmosphere, thus allowing valve 15 to close by its spring bias and thus interrupting flow of high pressure air to duct 17 and tire 18. Immediately after valve 15 closes, air pressure on the pilot of valve 13 flows back through choke or flow control 19 and control duct 38, and equilibrates with the pressure in the much larger volume of tire 18. If that pressure then has not reached the value to which the tire is to be inflated and is not sufficient to overcome the bias of valve 13, then valve 13 is reopened by its bias, air supply pressure is applied to the pilot of valve 15, which opens, and high pressure air again is admitted through valve 15 to duct 17 and tire 18 until pressure again builds up on the pilot of valve 13 until it overcomes the bias of valve 13 and again closes it. The cycling of valve 13 closing and opening is repeated until the tire pressure achieves the value at which the bias of valve 13 is selected to allow valve 13 to remain closed.

A number of optional features can be added to the circuit to, among other things, increase the safety characteristics of the circuit and increase its flexibility. These features shown in FIG. 1 include a first pressure relief means, for example a pop safety valve, a spring check valve, or a side outlet relief valve 21, as illustrated in FIG. 1; this means is connected to duct 38 and can be set to discharge to atmosphere at a preselected pressure in duct 38 somewhat above the final pressure to which the tire 28 is to be inflated, thereby helping to ensure that pressure in duct 38 and tire 28 does not exceed the preselected level. A second optional feature illustrated in FIG. 1 is a pressure gauge 22 connected to duct 38 which, when valves 15 and 13 both are closed and duct 38 contains only the pressure in tire 18, registers that tire pressure. A third optional feature illustrated in FIG. 1 is a second pressure relief means also connected to duct 38 to serve as a back-up to side outlet relief valve 21, and is shown as a second side outlet valve 23. A fourth optional feature is a pressure bleed valve, 24, which is a spring biased, normally closed, manually opened, two-way valve by which the pressure in duct 38 and tire can be manually discharged to the atmosphere. A final optional feature shown in FIG. 1 is an over-ride arrangement by which the tire can be inflated beyond the pressure to which the bias of valve 13 is selected to limit it. The over-ride arrangement includes a spring biased, normally closed, manually opened, two-way valve, 25, connected to duct 16; on being manually opened, valve 25 admits high pressure air supply, through fifth duct 26 to the inlet of a pressure regulator, 27, which can be of adjustable type as illustrated or fixed. The outlet of the pressure regulator is connected by sixth duct 28 to duct 17 and, when valve 25 is open, permits air, at a regulated pressure much lower than the high pressure air supply, to continue inflating the tire at a rate which consequently is much slower than occurs when valve 15 is open. As a result the tire can be further inflated slowly while the pressure therein is monitored, for example visually by pressure gauge 22 to achieve a value exceeding the pressure limit set f or the tire by the bias of valve 13. The maximum pressure to which the tire could be inflated by this arrangement is the pressure permitted by the pressure regulator, which pressure can be adjusted if the regulator is of the adjustable type or preselected for an appropriate value if a fixed type regulator is used. In any event, the over-ride feature permits the gradual addition of pressure to tire up to an appropriate maximum which is greater than the maximum to which the tire can be safely be rapidly inflated by high pressure air through valve 15 in its open position. Such open position is not maintained when the pressure in tire 18 is sufficient to close valve 13 by overcoming its bias, and thus bleed line 14 and the pilot of valve 15, allowing the spring bias of valve 15 to close same.

It will be noted that the bias of valve 13 has not been defined simply as a spring bias, although it is shown as such in FIG. 1. This is because in practice the bias could be maintained, either in part or completely, by means other than a spring. The embodiments of the invention in FIGS. 2 and 3 illustrate these two options respectively.

Figure 2:
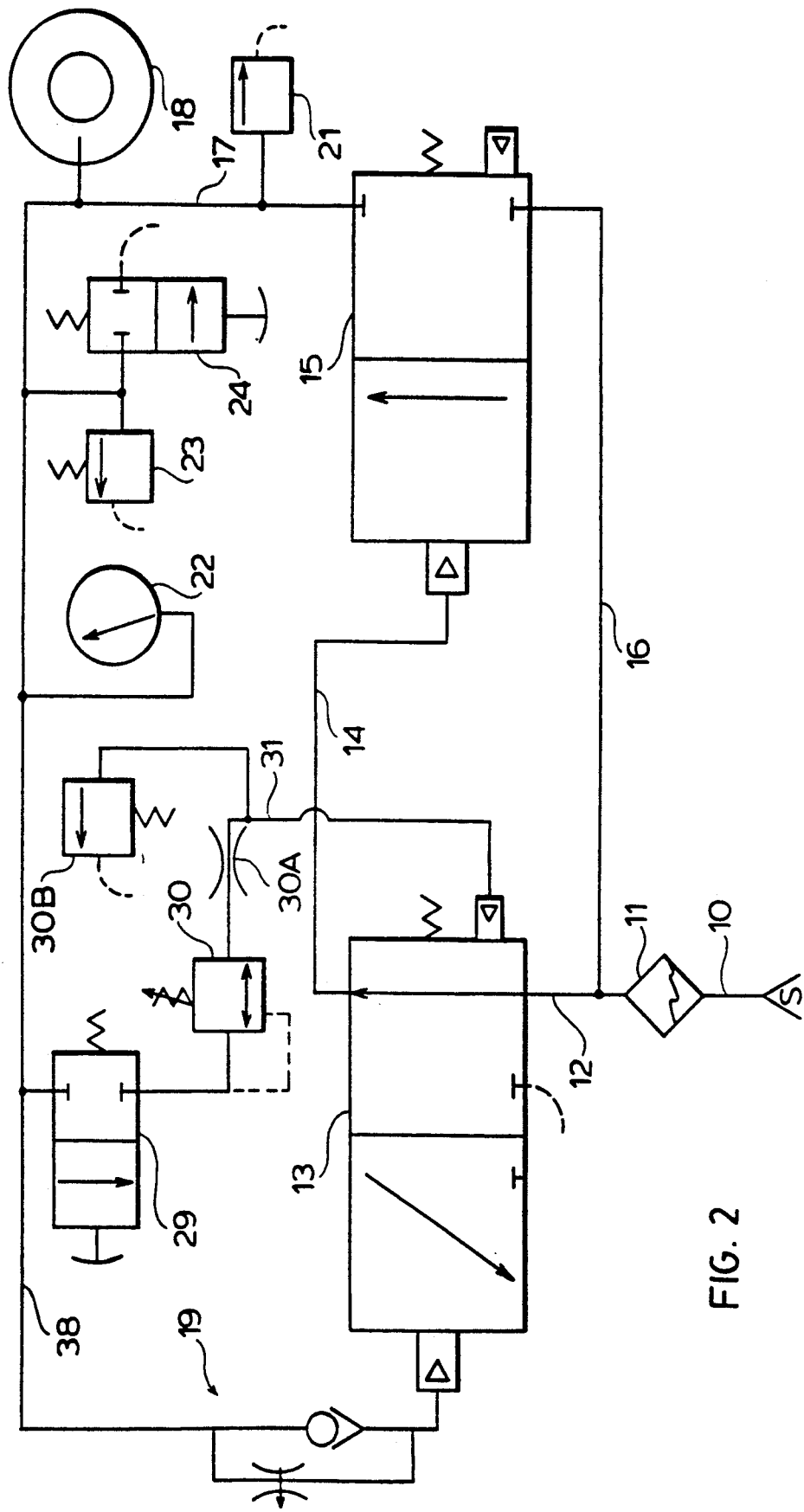
FIG. 2, another embodiment of the invention, is a schematic drawing of a pneumatic circuit similar to FIG. 1 and having some different optional arrangements.
Figure 3:
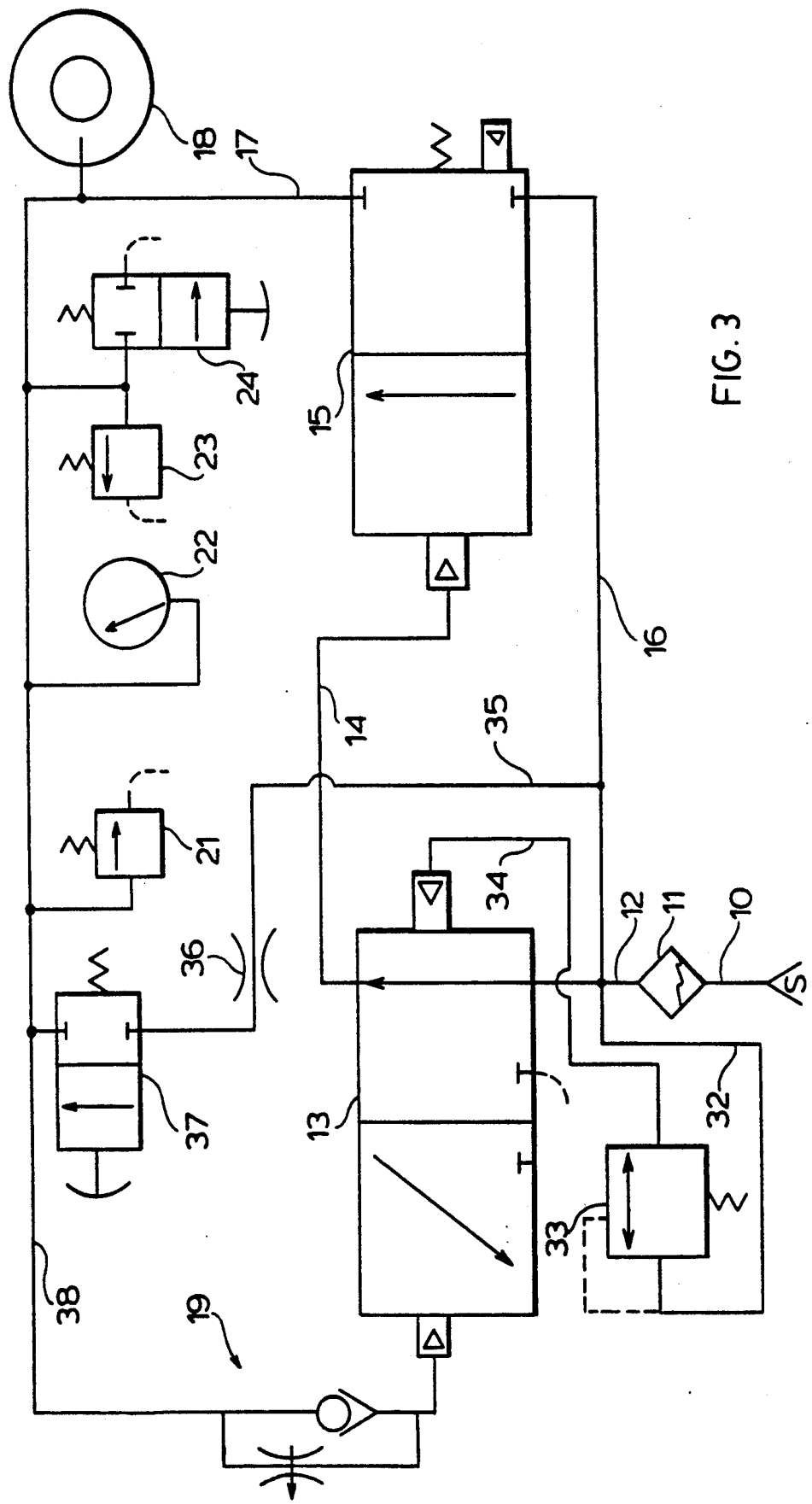
FIG. 3, another embodiment of the invention, is a schematic drawing of another pneumatic circuit having different optional alternative arrangements and being suitable for inflation of truck tires.

The embodiment of the invention illustrated in FIG. 2 operates basically in the same manner as that in FIG. 1, up to the point where the tire has been inflated to the pressure at which the pressure in control duct 38 remains above that required to overcome the spring bias keeping valve 13 in its first position; at this point valve 13, remains in its second position, line 14 is bled to atmosphere and valve 15 remains closed under its spring bias. If it is now desired to over-ride the circuit and admit additional air pressure to the tire, a spring biased, normally closed, manually operated, two-way valve, 29, connected to duct 38 , is manually opened by the operator to admit air at the pressure in duct 38 and in the tire 18 to the inlet of a pressure regulator, 30, which can be of the adjustable type as illustrated in FIG. 2 or a fixed type (not shown). In either case air at reduced pressure from the outlet of the regulator is led by seventh duct, 31, to a second pilot on valve 13. This air pressure on the second pilot adds pilot pressure bias to the open position of the valve, and supplements the bias of the spring which tends to keep valve 13, open, thus overcoming the pressure in duct 38 which has closed valve 13 and permitting it to admit high pressure air to duct 14 again, thus opening valve 15 by its pilot and again admitting high pressure air to line 17 and tire 18. The pressure regulator 30 precludes the pressure on the second pilot from adding more than a preselected amount of bias to the bias provided by the spring of valve 13 (or a fixed amount of bias pressure regulator of the fixed type is used). Thus if valve 29 is manually held open to over-ride the initial bias of valve 13 which limits the pressure built up in tire 18, valve 13 still operates to limit the pressure built up in tire 18, albeit the built-up pressure is greater when valve 29 is open, the increment being set by the setting or characteristics of pressure regulator 30 through which supplemental pressure bias is added to the spring bias of valve 13. A less preferred form of the embodiment of FIG. 2 has a simple choke 30A in duct 31 instead of a pressure regulator 30. Such an arrangement permits the over-ride to add an unlimited amount of supplemental pilot pressure bias to the spring bias of valve 13, thus permitting a greater build-up of pressure in the tire, which build-up would have to be monitored visually on the pressure gauge and interrupted by closure of valve 29 when the desired amount of build-up has been achieved. To guard against operator inattention or faulty operation of the pressure gauge 22 if a choke 30A is used instead of a pressure regulating valve 30 in duct 31, it is imperative, for safety reasons, to have a third pressure relief means, for example a side outlet relief valve, 30B, connected to duct 31 and set to discharge to atmosphere when the pressure in line 31 goes significantly (i.e., to an unsafe level) above that required to provide the necessary pilot pressure and supplementary bias to open valve 13. Pressure relief means 21 and 23 also prevent unlimited build-up from exceeding the safe pressure limit at which these means are designed to discharge control duct 38 to atmosphere, whether they are side outlet relief valves, as shown, or simple pop valves or spring check valves, as mentioned with reference to FIG. 1.

The embodiment of the invention illustrated FIG. 3 differs again from that of FIG. 1 in the way valve 13 is operated, and also from that of FIG. 2 in the same respect. The pneumatic circuit of FIG. 1 uses only a spring bias to hold valve 13 in its normally open position. The circuit of FIG. 2 uses spring bias to hold valve 13 in its open position until the optional over-ride feature is manually put into operation, at which time the spring bias is supplemented by pressure in line 31 to a second pilot on valve 13, assisting the spring in maintaining valve 13 open. The circuit of FIG. 3 does not have any spring bias to hold valve 13 in its normally open position. The necessary bias to maintain valve 13 in its normally open position is provided by air pressure from first duct 13, taken through an eighth duct, 32, through an adjustable or fixed pressure regulator, 33, and ninth duct, 34, to the second pilot on valve 13. The regulated air pressure provided by pressure regulator 33 in duct 34 to second pilot of valve 13 provides a uniform bias comparable to the uniform bias provided by the spring in valve 13 of FIG. 1. Thus when air from the supply line 10 is admitted to the pneumatic circuit, valves 13 and 15 operate exactly as they do in the embodiment described in FIG. 1, until the pressure in tire 18 reaches the value to which it is to be inflated and the steady pressure therein, through duct 38 and the first pilot on valve 13, closes valve 13 by overcoming the bias provided by the second pilot and pressure in duct 34. The appropriate pressure in duct 34 to provide the desired bias for the second pilot of valve 13 is obtained by selection of an appropriate fixed pressure regulator 33, or adjustment of an alternative corresponding adjustable pressure regulator to provide only sufficient pressure in duct 34 to maintain valve 13 open until air pressure in tire 18, exerted through control duct 38, has reached the preselected value and closes valve 13 through the first pilot thereon. Should it then be desired to raise the pressure in tire 18 somewhat above the preselected value under manual control, an optional over-ride arrangement is provided by tenth duct 35 connected to the high pressure supply, for example duct 16, and containing a choke 36 and spring biased, normally closed, manually opened, two-way valve 37, discharging into duct 38. The additional pressure thus provided in duct 38 not only ensures that valves 13 and 15 are kept in their closed positions, but also further inflates tire 18 by air flow in duct 38 in direction reverse to the normal air flow in duct 38 during inflation of the tire. Pressure relief valves 21 and 23, set to discharge pressure in duct 38 to atmosphere if it goes above a safe level, ensure that the over-ride arrangement is not abused to over-inflate the tire to an unsafe extent, and gauge 22 enables the operator operating the manual over-ride to monitor the pressure in tire 18 as it builds up above the preselected value.

Numerous other modifications may be made to the specific embodiments and expedients described without departing from the present invention, the scope of which is defined in the following claims.

What is claimed is:

1. A pneumatic circuit for air inflation devices having a high pressure pneumatic supply line connected to an object to be inflated to a pressure significantly lower than the supply line pressure, through an operator controlled valve in said high pressure pneumatic supply line, said pneumatic circuit being operative for stopping inflation once a preselected pressure is equalled, said pneumatic circuit comprising:

1) a first pneumatic duct adapted for connecting high pressure air from the outlet of said operator controlled valve to the inlet of a two-position three-way pilot operated valve having non-adjustable biasing means for being normally biased to a first position in which air pressure to the said inlet is transmitted through the valve then, by a second pneumatic duct, directly to the pilot side of 2) a spring biased, normally closed, pilot opened, two-way valve, said three-way pilot operated valve being adapted to overcome its bias by pneumatic pressure in its first pilot which moves said three-way pilot operated valve to a second position in which air pressure in said second pneumatic duct is discharged back through said three-way valve to atmosphere, 3) a third pneumatic duct connecting high pressure air from the outlet of said operator controlled valve to the inlet of said spring biased two-way valve, 4) a fourth pneumatic duct adapted for connecting the outlet of said spring biased two-way valve to an object to be inflated, and 5) a pneumatic control duct connecting said fourth pneumatic duct through a pneumatic flow control to said first pilot on said two-position three-way pilot operated valve, the bias of said two-position three-way pilot operated valve being adapted to maintain said two-position three-way pilot operated valve in said first position when the pressure in said pneumatic control duct is below the pressure to which the object is to be inflated.

2. A pneumatic circuit as claimed in claim 1 in which the bias to maintain the said three-way pilot operated valve in said first position is a spring bias.

3. A pneumatic circuit as claimed in claim 2 and further including a spring biased, normally closed, manually opened, two-way valve with its inlet connected to said pneumatic control duct and its outlet connected through a pressure regulator to a second pilot on said three-way, pilot operated valve normally biased to said first position, said second pilot supplementing the bias of said three-way pilot operated valve to maintain it in said first position.

4. A pneumatic circuit as claimed in claim 3 and further including:

(a) at least one pressure relief means connected to said pneumatic control duct and adapted to discharge to atmosphere the pressure in said pneumatic control duct at a preselected pressure in said duct above the final pressure to which the object is to be inflated, (b) a pressure gauge connected to said pneumatic control duct, and (c) a manually operable pressure bleed valve connected to said pneumatic control duct.

5. A pneumatic circuit as claimed in claim 2 and further including (a) a spring biased, normally closed, manually opened, two-way valve with its inlet connected to said pneumatic control duct and its outlet connected through a choke to a second pilot on said thee-way, pilot operated valve normally biased to said first position, said second pilot supplementing the bias of said three-way pilot operated valve to maintain it in said first position, and (b) a pressure relief means connected to said second pilot and adapted to discharge to atmosphere when the pressure on the second pilot goes to a preselected level above the required to provide supplementary bias to said three-way, pilot operated valve.

6. A pneumatic circuit as claimed in claim 5 and further including at least one pressure relief means connected to said pneumatic control duct and adapted to discharge to atmosphere the pressure in said pneumatic control duct at a preselected pressure in said duct above the final pressure to which the object is to be inflated, (b) a pressure gauge connected to said pneumatic control duct, and (c) a manually operable pressure bleed valve connected to said pneumatic control duct.

7. A pneumatic circuit as claimed in claim 1 in which the bias to maintain the said three-way pilot operated valve in said first position is a second pilot on said pilot operated valve, said second pilot being operated by reduced pneumatic pressure from a pressure regulator connected to said first pneumatic duct.

8. A pneumatic circuit as claimed in claim 7 in which the pressure regulator is a fixed pressure regulator.

9. A pneumatic circuit as claimed in claim 8 and further including a spring biased, normally closed, manually opened, two-way valve with its inlet connected through a choke to the high pressure air supply in said first duct and its outlet connected to said control duct.

10. A pneumatic circuit as claimed in claim 9 and further including at least one pressure relief means connected to said pneumatic control duct and adapted to discharge to atmosphere the pressure in said pneumatic control duct at a preselected pressure in said duct above the final pressure to which the object is to be inflated, (b) a pressure gauge connected to said pneumatic control duct, and (c) a manually operable pressure bleed valve connected to said pneumatic control duct.

11. A pneumatic circuit for air inflation devices having a high pressure pneumatic supply line connected to an object to be inflated to a pressure significantly lower than the supply line pressure, through an operator controlled valve in said high pressure pneumatic supply line, said pneumatic circuit comprising:

1) a first pneumatic duct adapted for connecting high pressure air from the outlet of said operator controlled valve to the inlet of a three-way pilot operated valve normally biased to a first position in which air pressure to the said inlet is transmitted through the valve then, by a second pneumatic duct, directly to the pilot side of 2) a spring biased, normally closed, pilot opened, two-way valve, said three-way pilot operated valve being adapted to overcome its bias by pneumatic pressure in its first pilot which moves said three-way pilot operated valve to a second position in which air pressure in said second pneumatic duct is discharged back through said three-way valve to atmosphere, 3) a third pneumatic duct connecting high pressure air from the outlet of said operator controlled valve to the inlet of said spring biased two-way valve, 4) a fourth pneumatic duct adapted for connecting the outlet of said spring biased two-way valve to an object to be inflated, 5) a pneumatic control duct connecting said fourth pneumatic duct through a pneumatic flow control to said first pilot on said three-way pilot operated valve, the bias of said three-way pilot operated valve being adapted to maintain said three-way pilot operated valve in said first position when the pressure in said pneumatic control duct is below the pressure to which the object is to be inflated, and 6) at least one pressure relief means connected to said pneumatic control duct and adapted to discharge to atmosphere the pressure in said pneumatic control duct at a preselected pressure in said duct above the final pressure to which the object is to be inflated.

12. A pneumatic circuit as claimed in claim 11 and further including a pressure gauge connected to said pneumatic control duct.

13. A pneumatic circuit as claimed in claim 12 and further including a manually operable pressure bleed valve connected to said pneumatic control duct.

14. A pneumatic circuit as claimed in claim 13 and further including (1) a spring biased normally closed, manually opened two-way valve with its inlet connected to said third duct and its outlet connected to the inlet of (2) a pressure regulator having its outlet connected to said fourth duct, said pressure regulator being adapted to increase the pressure in said fourth duct.

15. A pneumatic circuit as claimed in claim 14 in which the bias to maintain the said three-way pilot operated valve in said first position in a spring bias.

* * * * *